(12) United States Patent
Baumgarte et al.

(10) Patent No.: US 10,135,833 B2
(45) Date of Patent: Nov. 20, 2018

(54) CREDENTIAL DRIVING AN AUTOMATIC LOCK UPDATE

(71) Applicant: Schlage Lock Company LLC, Indianapolis, IN (US)

(72) Inventors: Joseph W. Baumgarte, Carmel, IN (US); Benjamin J. Hopkins, Zionsville, IN (US); David G. Studt, Noblesville, IN (US)

(73) Assignee: Schlage Lock Company LLC, Carmel, IN (US)

( * ) Notice: Subject to any disclaimer, the term of this patent is extended or adjusted under 35 U.S.C. 154(b) by 202 days.

(21) Appl. No.: 15/136,198

(22) Filed: Apr. 22, 2016

(65) Prior Publication Data

US 2016/0352749 A1    Dec. 1, 2016

Related U.S. Application Data

(60) Provisional application No. 62/168,715, filed on May 29, 2015.

(51) Int. Cl.
| | |
|---|---|
| *H04L 29/06* | (2006.01) |
| *G06F 17/30* | (2006.01) |
| *H04W 12/08* | (2009.01) |
| *G06F 21/62* | (2013.01) |

(52) U.S. Cl.
CPC ...... *H04L 63/102* (2013.01); *G06F 17/30477* (2013.01); *H04L 63/08* (2013.01); *H04W 12/08* (2013.01); *G06F 21/62* (2013.01)

(58) Field of Classification Search
None
See application file for complete search history.

(56) References Cited

U.S. PATENT DOCUMENTS

| | | |
|---|---|---|
| 7,941,831 B2 | 5/2011 | Mandhana et al. |
| 8,264,322 B2 | 9/2012 | Rodenbeck et al. |

(Continued)

FOREIGN PATENT DOCUMENTS

WO    2014016695 A2    1/2014

OTHER PUBLICATIONS

International Search Report; International Searching Authority, US Patent and Trademark Office; International Application No. PCT/US2016/035036; dated Aug. 29, 2016; 2 pages.

(Continued)

*Primary Examiner* — Malcolm Cribbs
(74) *Attorney, Agent, or Firm* — Taft Stettinius & Hollister LLP

(57) ABSTRACT

An access control system including a data storage device configured to store a master credential database having a plurality of master identifiers and master status codes, an access control device having a local credential database including a plurality of local identifiers, and an electronic credential including a credential identifier. The access control device is configured to receive the credential identifier from the electronic credential, to determine whether to perform an update based upon the local status code associated with the local identifier of the credential identifier, and to update data in the local credential database with data in the master credential database by way of communication with the data storage device in response to the determining.

20 Claims, 2 Drawing Sheets

(56) References Cited

U.S. PATENT DOCUMENTS

| | | | |
|---|---|---|---|
| 2003/0140223 A1* | 7/2003 | Desideri | H04L 63/0272 |
| | | | 713/153 |
| 2008/0163361 A1 | 7/2008 | Davis et al. | |
| 2008/0174403 A1 | 7/2008 | Wolpert et al. | |
| 2010/0077474 A1 | 3/2010 | Yacoub et al. | |
| 2010/0269153 A1* | 10/2010 | Kato | G06F 21/31 |
| | | | 726/3 |
| 2010/0274859 A1 | 10/2010 | Bucuk | |
| 2010/0283579 A1 | 11/2010 | Kraus et al. | |
| 2011/0187505 A1 | 8/2011 | Faith et al. | |
| 2011/0223857 A1 | 9/2011 | Vila Errandonea et al. | |
| 2011/0252843 A1 | 10/2011 | Sumcad et al. | |
| 2011/0254659 A1* | 10/2011 | Bowen | G07C 9/00158 |
| | | | 340/5.6 |
| 2011/0307451 A1* | 12/2011 | El Haddi | G06F 17/30073 |
| | | | 707/673 |
| 2011/0311052 A1 | 12/2011 | Myers et al. | |
| 2013/0192316 A1 | 8/2013 | McKibben et al. | |
| 2013/0212248 A1 | 8/2013 | Neafsey et al. | |
| 2014/0035722 A1* | 2/2014 | Kincaid | G07C 9/00111 |
| | | | 340/5.61 |
| 2014/0273965 A1* | 9/2014 | Raleigh | H04W 12/04 |
| | | | 455/411 |
| 2016/0205138 A1* | 7/2016 | Krishnaprasad | G06F 21/57 |
| | | | 726/1 |

OTHER PUBLICATIONS

Written Opinion; International Searching Authority, US Patent and Trademark Office; International Application No. PCT/US2016/035036; dated Aug. 29, 2016; 10 pages.

\* cited by examiner

CREDENTIAL DRIVING AN AUTOMATIC LOCK UPDATE

TECHNICAL FIELD

The present application generally relates to an access control device, and more particularly but not exclusively relates to an access control device which automatically updates when a user presents a new authorized electronic credential to the device.

BACKGROUND

Present access control devices suffer from a variety of drawbacks, limitations, disadvantages and problems including high power consumption and system update logistical requirements. For example, certain battery powered access control devices query a central server each time an unrecognized credential is presented. Each query requires activation of a network communicator which consumes power. In another example, certain access control systems require an administrator to visit the access control devices in an access control system to update the authorized credential data associated with each device being accessed, including a lock. Therefore, a need exists for further technological developments in the area of access control devices.

SUMMARY

One exemplary embodiment is an access control system including a data storage device configured to store a master credential database including a plurality of master identifiers and master status codes, an access control device having a local credential database including a plurality of local identifiers, and an electronic credential including a credential identifier. The access control device is configured to receive the credential identifier from the electronic credential, to determine whether to perform an update based upon the local status code associated with the local identifier of the credential identifier, and to update data in the local credential database with data in the master credential database by way of communication with the data storage device in response to the determining. Further embodiments, forms, features, and aspects of the present application will become apparent from the description and figures provided herewith.

DETAILED DESCRIPTION OF ILLUSTRATIVE EMBODIMENTS

Figure 1:
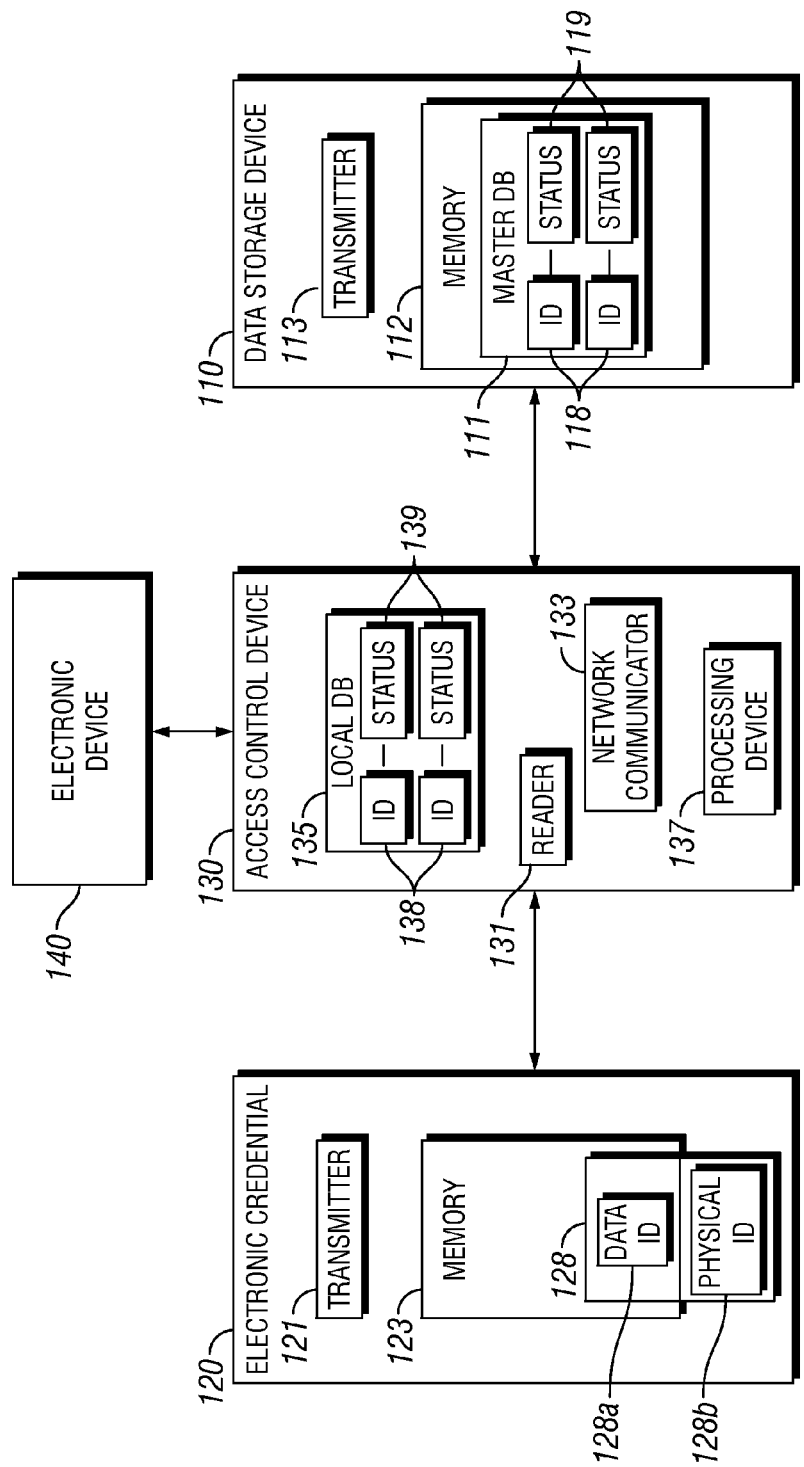
FIG. 1 is a schematic block diagram of an access control system according to an embodiment of the invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Referring to FIG. 1, there is illustrated a block diagram depicting an exemplary access control system 100 configured to grant or deny access to a secured area such as an event ground, a building, or a portion of a building. The system 100 includes a data storage device 110, an electronic credential 120, and an access control device 130.

The storage device 110 includes a memory device 112, a master database 111, and a transceiver 113. The memory device holds the master database 111 having a plurality of master identifiers 118 and a plurality of master status codes 119. Each master status code 119 is associated with one identifier 118. The master database 111, in different embodiments, includes additional information related to each master identifier 118. The master identifier 118 includes one or more a unique identifiers having a numeric, alphanumeric, or alphabetic character string associated with an electronic credential 120, as will be discussed in further detail below. The master status code 119 associated with each master identifier 118 indicates to an access control device 130 whether to grant access, deny access, perform a database update, and/or carry out another command. In one embodiment, the storage device 110 is a server. In other embodiments, the storage device 110 is a part of a network such as, for example, a cloud computing network. In other embodiments, the system 100 may include more than one storage device 110.

In the illustrated form, the transceiver 113 is a bidirectional communication device operable to send data from the master database 111 to the access control device 130, and to receive data from the access control device 130. The transceiver 113 is also capable of transferring data to other devices and receiving data from other devices such as, for example, a computer. In one embodiment, the transceiver 113 communicates with other devices via a wireless connection such as WiFi, Bluetooth, BLE, Zigbee, or Z-Wave. In one embodiment, the transceiver 113 communicates with another device via a wired connection. In other embodiments, the transceiver 113 may be configured as a transceiver, a network adapter, a network card, an interface, or a port (e.g., a USB port, serial port, parallel port, and analog port, digital port, VGA, DVI, HDMI, FireWire, CAT 5, or any other suitable type of port or interface). The transceiver 113 includes hardware, software, and/or firmware which enables the transfer of data between the data storage device 110 and other devices such as, for example, the access control device 130. It is contemplated that the transceiver 113 may include more than one of the adapters, cards, or ports.

The storage device 110 is operable to store the master database 111 in the memory device 112. The storage device 110 responds to a request for a database update transmitted by the access control device 130 to the storage device 110. In response, data is transmitted from the master database 111 to the access control device 130. The storage device 110 is operable to receive data from the transceiver 113, and to modify the master database 111 using the received data. From time to time, a site administrator 102 (FIG. 2) modifies the master database 111 by transmitting data to the transceiver 113 so as to change permissions of an existing user 104 (FIG. 2) or to add or remove an identifier 118.

The electronic credential 120 includes a transceiver 121, a memory device 123 and a credential identifier 123. The electronic credential 120 is associated with a unique credential identifier 128, and is operable to transmit the credential identifier 128 to the access control device 130. In one or more embodiments, the credential identifier 128 is displayed on the electronic credential 120 and/or is stored in the memory device 123 within the electronic credential 120. In one embodiment, the electronic credential 120 is a contactless smartcard. In another embodiment, the electronic credential 120 is a mobile device. In one embodiment, the credential identifier 128 and the transceiver 121 are provided as a barcode printed on the electronic credential 120. In another embodiment, the access control system 100 includes a plurality of electronic credentials.

The transceiver 121 is operable to transmit the credential identifier 128. In one embodiment, the transceiver 121 is self-powered. For example, the transceiver 121 is powered by a battery located within the electronic credential 120. In another embodiment, the access control device 130 powers the transceiver 121 before the transceiver 121 provides an identifier to the access control device 130. For example, the access control device 130 may inductively transfer power to the transceiver 121. In other embodiments, the electronic credential 120 does not necessarily need to be powered.

The access control device 130 includes a reader device 131, a network communicator 133, a local database 135, and a processing device 137. In one embodiment, the access control system 100 includes more than one access control device 130. In another embodiment, the access control device 130 is affixed to a permanent structure near a point of ingress to the secured area. In a further embodiment, the access control device 130 is a handheld electronic device. In other embodiments, the access control device 130 may be powered by a battery or other means of providing power, as is known in the art.

The reader device 131 is operable to detect the electronic credential 120, and to receive the credential identifier 128 from the electronic credential 120. The reader device 131, in different embodiments includes, for example, a barcode scanner, a QR (quick response) code scanner, a magnetic strip reader, or any other device configured to read a code physically imprinted on the electronic credential 120. In one embodiment, the reader 131 receives the credential identifier 128 from the electronic credential 120 via a wireless connection, such as RFID, WiFi, Bluetooth, BLE, Zigbee, or Z-Wave.

The network communicator 133 is operable to send a database update request to the data storage device 110, and to receive data from the data storage device 110. In other embodiments, the network communicator 133 is configured as a gateway or a router. The network communicator 133 may be configured as a transceiver, a network adapter, a network card, am interface, or a port (e.g., a USB port, serial port, parallel port, and analog port, digital port, VGA, DVI, HDMI, FireWire, CAT 5, or any other suitable type of port or interface). The network communicator 133 includes hardware, software, and/or firmware which allows data to be transferred between the access control device 130 and other devices such as, for example, the data storage device 110. It is contemplated that the network communicator 133 may include more than one of the adapters, cards, or ports. It is further contemplated that the network communicator 133 includes other features and functionalities not previously discussed.

The circuitry of the electronic credential 120, the data storage device 110, and/or the network communicator 133 is configured to provide appropriate signal conditioning to transmit and receive data, and correspondingly may include filters, amplifiers, limiters, modulators, demodulators, CODECs, digital signal processing, and/or different circuitry or functional components as would occur to those skilled in the art to perform the desired communications.

The local database 135, similar to the master database 111, includes a plurality of local identifiers 138 and local status codes 139. Each local status code 139 is associated with one identifier. The local database 135 may be a prior or current version of the master database 111.

The access control device 130 also includes a processing device 137 operable to receive data from and transmit data to the reader device 131, the network communicator 133, and/or the local database 135. When the electronic credential 120 is presented to the reader device 131 for the first time, the processing device 137 receives the credential identifier 128 by way of the reader device 131, reviews the local status code 139 associated with the matching local identifier 138, and replaces data in the local database 135 with data in the master database 111. In one embodiment, the entire local database 135 may be replaced by the current version of the master database 111. In another embodiment, the local status codes 139 of the local database 135 may be replaced by data in the current version of the master database 111. In still another embodiment, only the local status code 139 which is associated with the local identifier 138 and which matches the credential identifier 128 presented to the access control device 130 is replaced by data from the master database 111.

In one embodiment, the processing device is a microcontroller which includes one or more individual controllers or microprocessors, each of which includes at least one processor coupled to a memory such as, for example, memory used to store the local database 135. The memory may include random access memory (RAM) devices comprising the main memory storage of the microcontroller, as well as any supplemental levels of memory (e.g., cache memories), non-volatile or backup memories (e.g., programmable or flash memories), or read-only memories (ROM). The processing device is configured to execute stored program instructions and store, transmit, receive and manipulate the data. The program instructions may be embodied as program code in software and/or as firmware resident in the processing device or in memory.

The processing device 137 makes a determination of whether to grant or deny access to the secured area as a function of a comparison of the credential identifier 128 with one of the status codes 139. If the comparison indicates that access should be granted, the access control device generates an output signal to an electronic device 140. The electronic device 140 may be any type of input component or output component that allows data to be inputted to or outputted from the access control device 130. In one embodiment, the electronic device 140 is a locking mechanism having an unlocked state and a locked state. When the locking mechanism (the electronic device 140) receives an output signal to grant access, the locking mechanism 140 transitions to or remains in the unlocked state. When the locking mechanism receives an output signal configured to deny access, the locking mechanism 140 transitions to or remains in the locked state.

In another embodiment, the electronic device 140 is one or more of a switch, a router, a firewall, a server, a database, a mobile device, a networking device, a controller, a computer, a processing system, a printer, a display, an alarm, an illuminated indicate such as a status indicator, a keyboard, a mouse, and a touch screen display. In another form, the electronic device 140 is incorporated into the access control device 130 to provide a single unit having the functions of both the access control device 130 and the electronic device 140. It is further contemplated that in other embodiments, more than one electronic device is in communication with the access control device 130.

A schematic flow diagram and related description provides an illustrative embodiment of performing procedures of controlling an access control system, such as the system 100 illustrated in FIG. 1 and described above. The described operations and functions are understood to be exemplary only, and in different embodiments, the operations and functions are combined in whole or in part, divided, added or removed, as well as re-ordered in whole or in part. It is contemplated that the various aspects, features, processing devices, processes, and operations from the various embodiments may be used in association with any of the other embodiments. It should be understood that certain operations may be implemented by a computer executing a computer program product on a non-transient computer readable storage medium, where the computer program product includes instructions causing the computer to execute one or more of the operations, or to issue commands to other devices to execute one or more operations.

While the embodiments described hereinafter may not specifically describe features analogous to those described above, such features may nonetheless be utilized in connection with the described systems.

Figure 2:
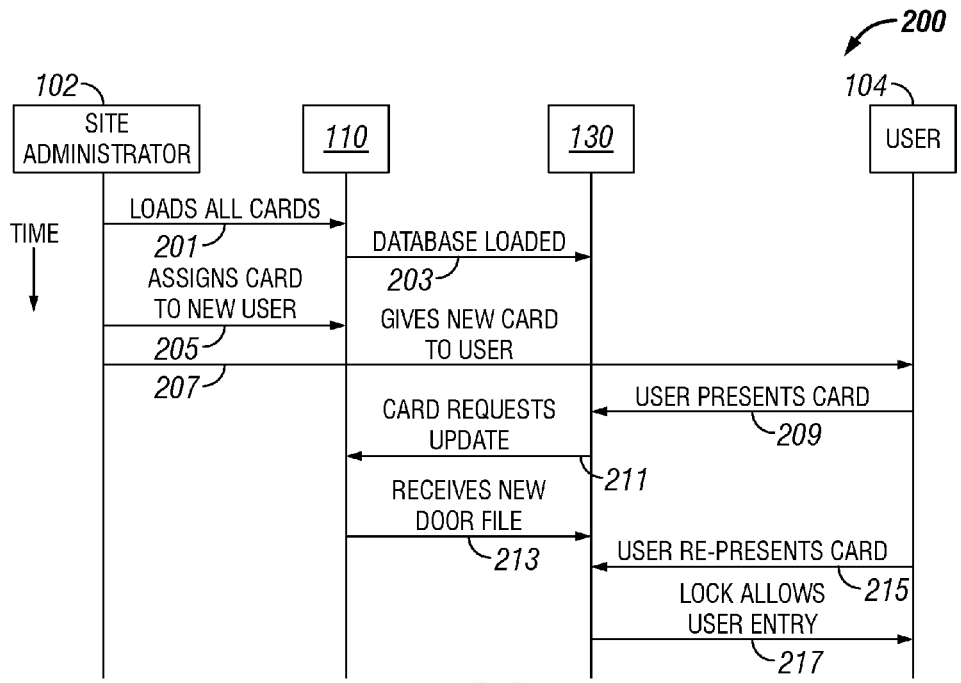
FIG. 2 is a schematic flow diagram of a process of operating an access control system.

Referring to FIG. 2, shown therein is a flow diagram illustrating one embodiment of a process 200 for controlling an access control system, such as the system 100 illustrated in FIG. 1. The process 200 begins with an operation 201 which includes uploading master identifiers 118 and associated status codes 119 to the master database 111. The operation 201 is, for example, performed by a site administrator 102 or other authorized personnel. The master identifiers 118 correspond to each authorized electronic credential 120 intended to be used with the access control system 100, even if they are not initially assigned to a user 104. A status code 119 indicating that access should be granted is associated with the credential 120 given to existing users 104. Once the association of the status code 119 to the credential has been completed, the electronic credential 120 of the authorized existing user 104, if presented to the reader 131, grants immediate access to the secure area. The status code 119 associated with electronic credentials 120 which are not associated with existing users 104 initially indicate that a database update should be initiated.

After the identifiers and status codes have been uploaded to the master database 111, the process 200 proceeds to a load database operation 203 in which the master database 111 is transferred to the local database 135 of the access control device 130. The process 200 proceeds to an assign new card operation 205 in which the site administrator 102 assigns the electronic credential 120 to a new user 104. The site administrator 102 updates the master database 111 such that the status code 119, associated with the credential identifier 128 of the electronic credential 120 assigned to the new user 104, indicates access should be granted to the new user 104. The process 200 proceeds to a provide new card to user operation 207 in which the new user 104 receives a new electronic credential 120 from the site administrator 102.

After the master database 111 has been updated with the identifier 118 associated with the electronic credential 120 and the new user 104 has received the credential 120, the process 200 proceeds to a user presents the credential 120 operation 209. This operation begins when the new user 104 presents the electronic credential 120 to the access control device 130 for the first time. In the operation 209, the access control device 130 accesses the local database 135 and reads the local status code 139 associated with electronic credential 120. The process 200 then proceeds to a card requests update operation 211. In this operation 211, the local status code 139 provides an instruction indicating that a database update is required. Upon receipt of the instruction, the access control device 130 requests data from master database 111. The process 200 proceeds to a receive new door file operation 213 in which the data storage device 110 transmits data from master database 111 to the access control device 130. The transmitted data includes the local status code associated with the electronic credential 120 which is assigned to a particular user. The local database 135 of the access control device 130 is updated by the newly received data from the storage device 110. After the local database 135 is updated with the newly received data, the process 200 proceeds to a user re-presents card operation 215 in which the new user 104 presents the electronic credential 120 to the access control device 130 a subsequent time. The access control device 130 reads the local status code 139 associated with the electronic credential 120 and generates a signal to grant access to the user 104.

Figure 3:
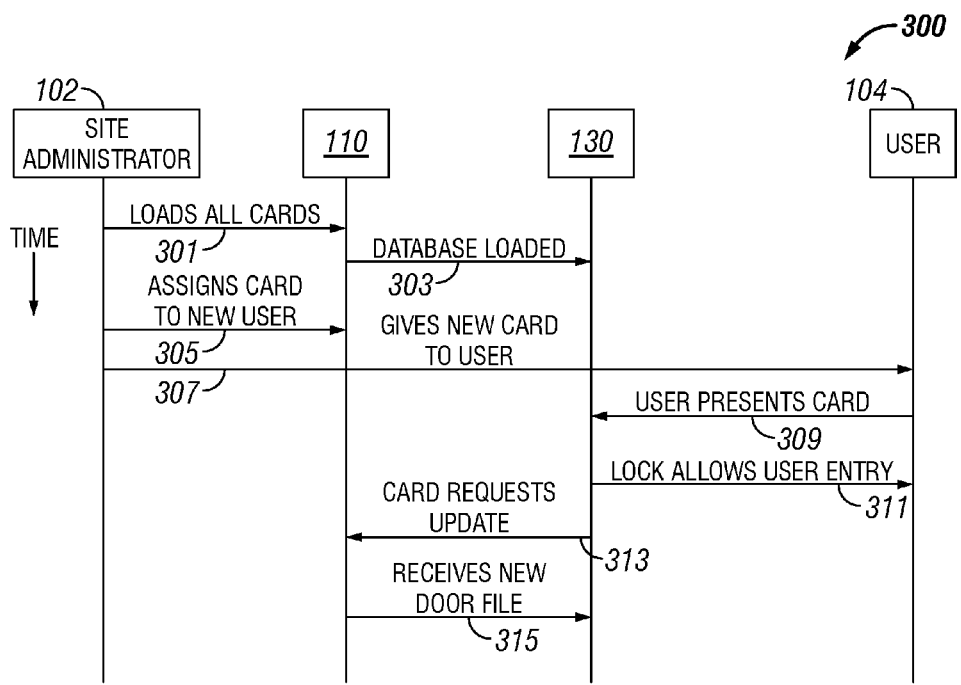
FIG. 3 is a schematic flow diagram of a process of operating an access control system.

Referring to FIG. 3, shown therein is a flowchart illustrating one embodiment of a process 300 for controlling an access control system, such as the system 100 illustrated in FIG. 1. The exemplary process 300 begins with a load all cards operation 301 in which a site administrator 102 loads the master database 111 into the data storage device 110. Each master status code 119 associated with electronic credentials 120 not given to existing users 104 initially indicates a database update should be initiated and access should be granted. The process 300 proceeds to a database loaded operation 303 in which the master database 111 is transferred to the local database 135 of the access control device 130.

The process 300 proceeds to an assigns card to new user operation 305 in which the site administrator 102 assigns an electronic credential 120 to a new user 104, and updates the master database 111 in the data storage device 110. The assignment of the master status code 119 associates the new user 104 with the credential identifier 128 of the electronic credential 120 which indicates that access should be granted to the new user 104. The process 300 proceeds to a gives new card to user operation 307 in which the new user 104 receives the electronic credential 120. The process 300 then proceeds to a user presents card operation 309 in which the new user 104 presents the electronic credential 120 to the access control device 130 for the first time. The access control device 130 accesses the local database 135 and reads the local status code 139 associated with the credential identifier 128. Process 300 then proceeds to a lock allows user entry operation 311 where the access control device 130 grants access to the new user 104. Process 300 proceeds to a card requests update operation 313 where the access control device 130 requests a new door file from the master database 111, and then proceeds to a receive new door file operation 315 where the data storage device 110 transmits the current version of the master database 111 to the access control device 130, and the local database 135 of the access control device is replaced by the newly received version of the master database 111. In one embodiment, only the local status code 139 of the one local identifier 138 in question is updated.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An access control system, comprising:
    a server configured to store a master credential database including a plurality of master identifiers and master status codes, wherein each of the master identifiers is associated with one of a plurality of local status codes;
    an access control device having a processor, a memory having a plurality of instructions stored thereon, and a local credential database including a plurality of local identifiers, wherein each of the plurality of local identifiers is associated with one of the plurality of local status codes, wherein each of the plurality of local identifiers is associated with one of the plurality of the master identifiers, wherein the plurality of local status codes includes a first status code and a second status code, wherein the first status code indicates that the access control device is to grant access to a presented credential having a credential identifier matching the local identifier stored in association with the first status code, and wherein the second status code indicates that the access control device is to initiate an update of the local credential database with data stored on the master credential database; and
    an electronic credential including a credential identifier, wherein the credential identifier is associated with one of the plurality of the master identifiers and one of the plurality of the local identifiers,
    wherein, in response to execution of the plurality of instructions by the processor, the access control device:
        receives the credential identifier from the electronic credential,
        determines whether to perform an update based upon the local status code associated with the local identifier of the credential identifier, and
        updates data in the local credential database with data in the master credential database by way of communication with the server in response to determining that the local status code associated with the local identifier of the credential identifier is the second status code.

2. The system of claim 1, further comprising a plurality of the electronic credentials, wherein each of the electronic credentials includes a unique credential identifier.

3. The system of claim 1, wherein the electronic credential is configured to receive power from the access control device.

4. The system of claim 1, wherein the electronic credential is a contactless smartcard.

5. The system of claim 1, wherein the electronic credential is a mobile device.

6. The system of claim 1, wherein the access control device and the server are in communication via a wireless connection.

7. The system of claim 6, wherein the wireless connection comprises a WiFi connection.

8. An access control device, comprising:
    a reader device configured to receive a credential identifier from an electronic credential;
    a network communicator configured to transmit and receive data over a network;
    a memory device configured to store a credential database including a list of local identifiers, wherein each of the local identifiers has an associated status code selected from a plurality of status codes, wherein the plurality of status codes includes a first status code and a second status code, wherein the first status code indicates that the access control device is to grant access to a presented credential having an identifier matching the local identifier stored in association with the first status code, and wherein the second status code indicates that the access control device is to initiate an update of the credential database with current data stored on a master credential database of a server; and
    a processing device configured to receive the credential identifier from the reader device, determine the credential identifier corresponds to a matching one of the local identifiers, transmit a credential database update request to the network by way of the network communicator in response to a determination that the status code associated with the matching local identifier is the second status code, replace data of the credential database with data received from the network in response to the credential database update request, and output a control signal to an electronic device based on the status code associated with the matching local identifier.

9. The device of claim 8, wherein the electronic device comprises a locking mechanism having a locked state and an unlocked state, and wherein the locking mechanism is configured to transition between the locked and unlocked states based on the control signal.

10. The device of claim 8, wherein the electronic device comprises an output component configured to display access request results.

11. The device of claim 8, wherein the electronic device is configured to selectively grant and deny access to a secured area in response to the control signal.

12. The device of claim 11, wherein the access control device is further configured to deny access to the secured area if the credential identifier does not correspond to any of the local identifiers.

13. A method for updating a credential database associated with an access control device, the method comprising:
    receiving, by the access control device, a presented identifier corresponding with an electronic credential presented to a reader device associated with the access control device;
    comparing, by the access control device, the presented identifier to a first credential database including a plurality of potential identifiers, each with an associated status code, wherein the associated status code is selected from a plurality of status codes that includes a first status code and a second status code, wherein the first status code indicates that the access control device is to grant access to a presented electronic credential having an identifier matching the potential identifier associated with the first status code, and wherein the second status code indicates that the access control device is to initiate an update of the first credential database with data stored on a second credential database of a remote server;

identifying, by the access control device, one of the plurality of potential identifiers that matches the received presented identifier; and determining, by the access control device, the status code associated with the matched one of the plurality of potential identifiers, wherein in response to the status code associated with the matched one of the plurality of potential identifiers being the second status code, updating the first credential database with data from the second credential database including identifiers, each with an associated status code.

14. The method of claim 13, further comprising receiving the presented identifier at the access control device a second time, and granting access to a secured area if the status code associated with the presented identifier in an updated first credential database is the first status code.

15. The method of claim 13, further comprising granting access to a secured area in response to the status code associated with the matched one of the plurality of potential identifiers being the first status code.

16. The method of claim 13, wherein updating the first credential database includes replacing at least the status code associated with the presented identifier with data from the second credential database.

17. The access control system of claim 1, wherein, in response to execution of the plurality of instructions by the processor, the access control device is further to grant access to the electronic credential without updating the data in the local credential database in response to determining that the local status code associated with the local identifier of the credential identifier is the first status code.

18. The device of claim 8, wherein the processing device is configured to output the control signal to the electronic device to grant access to the electronic credential in response to a determination that the status code associated with the matching local identifier is the second status code and in response to a determination that the replaced data of the credential database includes a new status code associated with the matching local identifier that is the first status code.

19. The device of claim 8, wherein the processing device is configured to output the control signal to the electronic device only in response to a determination that the status code associated with the matching local identifier is the first status code to grant access to the electronic credential.

20. The device of claim 8, wherein the control signal is indicative of a denial of access to the electronic credential in response to a determination that the status code associated with the matching local identifier is the first status code.

* * * * *